US007100795B2

(12) United States Patent
Kelly et al.

(10) Patent No.: US 7,100,795 B2
(45) Date of Patent: Sep. 5, 2006

(54) ADJUSTABLE REAR SPACER WALL ASSEMBLY FOR A VENDING MACHINE

(75) Inventors: Paul Hayward Kelly, Aiken, SC (US); Aron Philip Lewis, Aiken, SC (US); Joshua Robert Powell, Aiken, SC (US); Edmund Scott Richardson, Simpsonville, SC (US); John T. Samson, Aiken, SC (US)

(73) Assignee: Maytag Corporation, Newton, IA (US)

( * ) Notice: Subject to any disclaimer, the term of this patent is extended or adjusted under 35 U.S.C. 154(b) by 317 days.

(21) Appl. No.: 10/678,275

(22) Filed: Oct. 6, 2003

(65) Prior Publication Data

US 2004/0108793 A1 Jun. 10, 2004

Related U.S. Application Data

(60) Provisional application No. 60/415,763, filed on Oct. 4, 2002.

(51) Int. Cl.
*B65G 59/00* (2006.01)
*B65H 3/44* (2006.01)
*G07F 11/00* (2006.01)

(52) U.S. Cl. ........................ 221/131; 221/242; 221/92; 248/228.3; 248/243

(58) Field of Classification Search ................ 221/242, 221/91, 92, 123, 124, 131, 133, 154, 164; 312/35, 42, 60, 72, 73, 216, 45, 61, 265.5; 248/241, 298.1, 222.13, 222.12, 243
See application file for complete search history.

(56) References Cited

U.S. PATENT DOCUMENTS 1,055,201 A * 3/1913 Mason ........................ 248/244
2,528,418 A * 10/1950 Buckels ........................ 248/57
2,928,512 A * 3/1960 Slater et al. .................. 403/22
3,796,345 A 3/1974 Fessler
4,019,650 A 4/1977 Oden
4,036,400 A 7/1977 Oden
4,218,058 A * 8/1980 Hilbert et al. .............. 473/488
D259,080 S * 5/1981 Conti .......................... D8/381
4,685,590 A 8/1987 Negishi et al.
4,757,915 A * 7/1988 Albright et al. .............. 221/75
4,823,983 A * 4/1989 Groover et al. ............... 221/92
5,127,546 A * 7/1992 Chen .......................... 221/242
D369,535 S * 5/1996 Holtzman et al. ............. D8/71
5,529,207 A 6/1996 Oden et al.
5,713,490 A 2/1998 Oden et al.
5,791,516 A 8/1998 Wittern, Jr. et al.
6,116,462 A * 9/2000 Takamura et al. .......... 221/241
6,168,125 B1 * 1/2001 Winger et al. ........... 248/228.3
6,297,952 B1 * 10/2001 Liu et al. ..................... 361/685
6,302,293 B1 * 10/2001 Wittern et al. ................ 221/92
6,349,911 B1 * 2/2002 Feldpausch et al. ........ 248/243
6,357,606 B1 * 3/2002 Henry ....................... 211/59.3
6,402,111 B1 * 6/2002 Stewart et al. .............. 248/317
6,427,866 B1 * 8/2002 Hawker et al. ............. 221/132

(Continued)

*Primary Examiner*—Gene O. Crawford
*Assistant Examiner*—Rakesh Kumar
(74) *Attorney, Agent, or Firm*—Diederiks & Whitelaw, PLC

(57) ABSTRACT

A vending machine includes an adjustable channel assembly for varying the depth of a product stack area within the vending machine. Preferably two adjustable channel assemblies are mounted to a column wall to support a rear spacer wall that defines a back portion of the stack area. The rear spacer wall is selectively movable fore-to-aft in order to permit the stack area to be customized in order to accommodate various sized bottles and cans.

18 Claims, 12 Drawing Sheets

U.S. PATENT DOCUMENTS 6,431,398 B1 * 8/2002 Cook et al. ................. 221/124
6,513,887 B1 * 2/2003 Paczkowski et al. .......... 312/45
6,788,997 B1 * 9/2004 Frederick .................... 700/236
6,902,083 B1 * 6/2005 Michael et al. ............... 221/75

* cited by examiner

ADJUSTABLE REAR SPACER WALL ASSEMBLY FOR A VENDING MACHINE

CROSS-REFERENCE TO RELATED APPLICATIONS

The present application claims benefit of U.S. Provisional Patent Application Serial No. 60/415,763 entitled "ADJUSTABLE REAR SPACER WALL ASSEMBLY FOR A VENDING MACHINE" filed on Oct. 4, 2002.

BACKGROUND OF THE INVENTION

1. Field of the Invention

The present invention pertains to the art of vending machines and, more particularly, to an adjustable rear spacer wall assembly which enables a compartment to be readily adapted to store bottles and cans of various sizes.

2. Discussion of the Prior Art

Vending machines for dispensing cans and bottles typically include multiple compartments for storing the cans and bottles in columns. Each compartment is suitable for storing a depth of one or more cans or bottles. An adjustable product spacer that allows the vending of a variety of differently sized cans or bottles is often located at the rear of each compartment. The product spacers hang from the column walls and are often difficult to reposition. A person loading the vending machine is required to reach into the back of the column in order to reposition the product spacers.

For example, U.S. Pat. No. 5,529,207 discloses a vending machine having an adjustable retainer assembly. The retainer assembly includes a rear retainer, which extends across a compartment for storing bottles or cans, and intermediate retainers. The retainers are adjustably attached to compartment column walls. The column walls are provided with a row of slots and the retainers include hooks for engaging the compartment wall slots. The retainers may be adjusted to facilitate various sized bottles by positioning the hooks in the appropriate slots. However, the adjustable retainer assembly does not provide a quick method of adjusting the retainers. That is, a route or service person loading the containers is still required to reach into the columns and manually unhook the retainer and move it to its desired position and then rehook the retainer. This method of repositioning the retainers is considered undesirable and tedious.

In addition, it is becoming more common for manufacturers to produce various sized cans and bottles. It is desirable to have a single vending machine capable of accommodating a variety of sizes of bottles and cans. Moreover, the variety of available can and bottle sizes is increasing the frequency with which a person needs to adjust the retainer or column assemblies of the vending machines. Therefore, there exists a need in the art for a vending machine capable of accommodating various sized cans and bottles by providing an easily adjustable retainer or column assembly. It is an object of the present invention to provide a vending machine that improves vendor set up, reduces conversion time, and improves customer convenience by incorporating a rear spacer wall assembly that is easily adjustable from the front of the columns of a vending machine cabinet.

SUMMARY OF THE INVENTION

The present invention is directed to an adjustable rear wall column assembly for a vending machine. The vending machine includes a plurality of column walls, each having first and second side walls for defining product storage compartments or stack areas. Two adjustable channel assemblies are mounted to the first side wall of each column wall. The two adjustable channel assemblies make up an upper assembly and a lower assembly. Each pair of upper and lower adjustable channel assemblies support a rear spacer wall that hangs vertically near the rear of a respective stack area. The rear spacer wall forms the back wall of the stack area, and is adjustable fore-to-aft through the adjustable channel assemblies in order to allow the stack areas to accommodate various sized bottles and cans.

Each adjustable channel assembly includes a guide channel defining member, a guide arm, a rear spacer bracket, and a guide latch. Each guide channel defining member includes tabs for attachment to the first column wall. In operation, the guide channel defining member is the component of the adjustable channel assembly that remains stationary and acts as the support for the remainder of the assembly.

The guide arm, which is movable along the guide channel defining member, is a long, narrow piece that slidably connects to the guide channel defining member. The guide latch is attached to a first end of the guide arm and the rear spacer bracket is attached to a second end of the guide arm. The rear spacer wall is attached to the spacer brackets of the upper and lower adjustable channel assemblies and may be adjusted by lifting the guide latch from a locked position, wherein it is substantially parallel to the guide arm, to an unlocked position. When the guide latch is in an unlocked position, the guide arm may be positioned by pushing or pulling the guide latch until the guide arm is in the desired position. By moving the guide latch, the guide arm forces the rear spacer wall in the same direction. In addition, the upper and lower channel assemblies are independently adjustable to maximize the ease of adjustment. With this arrangement, a delivery person can change the position of the rear spacer wall simply and quickly to accommodate different sized product containers in the stack areas.

Additional objects, features and advantages of the present invention will become more readily apparent from the following further description of a preferred embodiment when taken in conjunction with the drawings wherein like reference numerals refer to corresponding parts.

DETAILED DESCRIPTION OF THE PREFERRED EMBODIMENT

Figure 1:
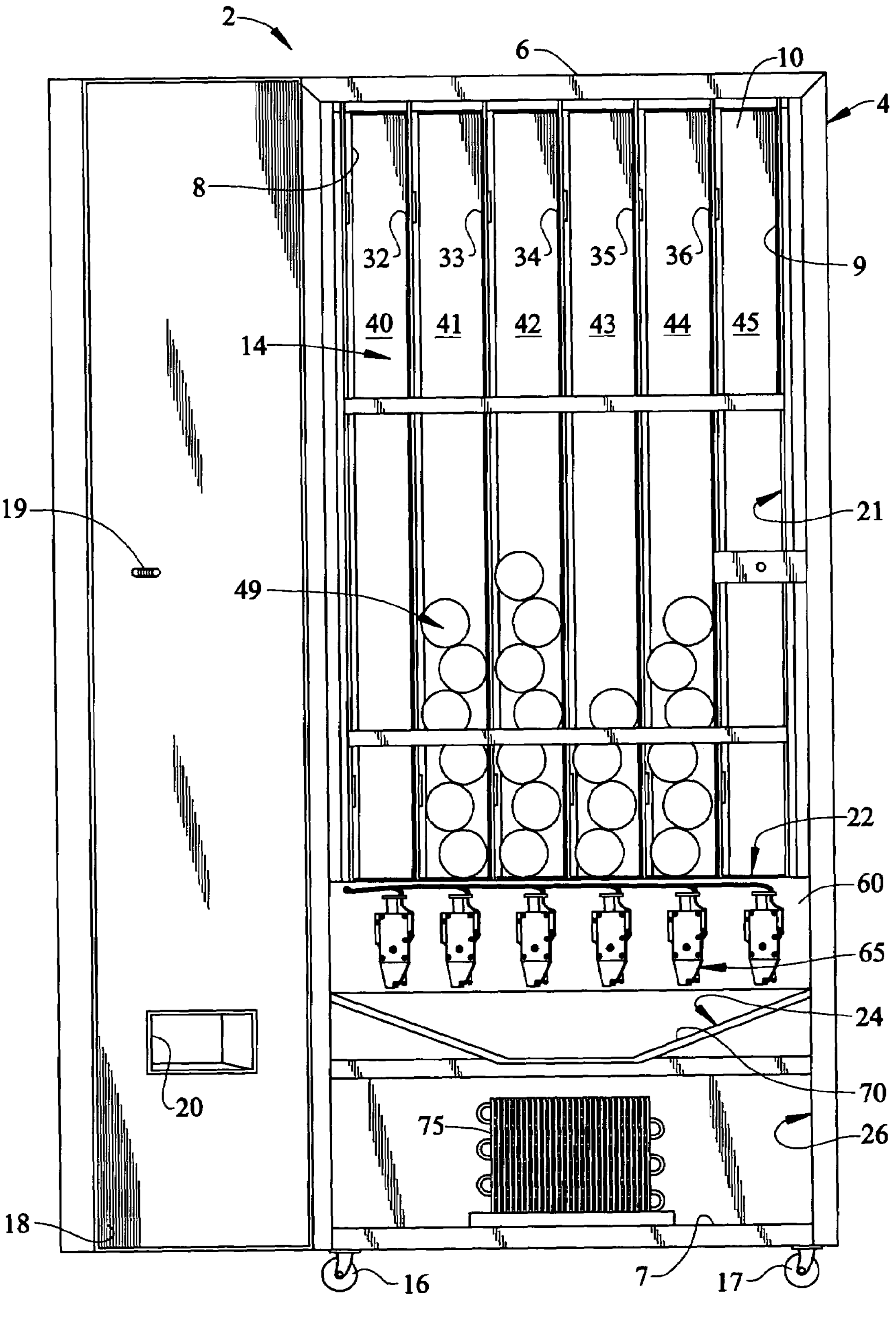
FIG. 1 is a front plan view of the inside of a vending machine incorporating the adjustable rear spacer wall assembly of the invention.

With initial reference to FIG. 1, a vending machine 2 includes a cabinet frame 4 having top, bottom, side and rear walls 6–10 that collectively define a central cavity 14. In a manner known in the art, a first pair of wheels or casters 16 and 17 are secured to a front edge portion of bottom wall 7 to facilitate the positioning of vending machine 2. Of course it should be realized that a second pair of wheels (not shown) are also arranged on a rear portion of bottom wall 7. A door 18 is pivotally mounted to cabinet frame 4 to selectively enable access to central cavity 14 in order to load various product containers or other commodities into vending machine 2. Door 18 is provided with a locking mechanism, shown in the form of a threaded rod 19, to retain door 18 in a closed position so as to prevent pilfering of the commodities from central cavity 14. Door 18 is also provided with an opening 20 to enable a consumer to remove a vended product container or other commodity from vending machine 2.

Central cavity 14 includes a storage section 21, a dispensing section 22, a delivery section 24 and a lower section 26. Storage section 21 is provided to hold products in escrow until a vending operation is performed. Toward that end, storage section 21 is provided with a plurality of vertically extending column walls 32–36 which, together with side walls 8 and 9, form a plurality of column or stack areas 40–45. In the embodiment shown in FIG. 1, stack areas 40–45 constitute single stack columns. However, it should be understood that the present invention also encompasses vending machines having multi-stack columns. In any event, stack areas 40–45 are partitioned by walls 32–36 to contain, separate and support a plurality of generally cylindrical containers 49 which, in the embodiment shown, constitute soda cans.

As further shown in FIG. 1, dispensing section 22 is provided with a frontal support wall 60 having arranged thereon a plurality of vend motors, one of which is indicated at 65. As will be discussed more fully below, a plurality of cradles (not shown) are arranged behind frontal support wall 60. Actually, each column or stack area 40–45 is provided with an associated cradle (not shown) that is operated through a respective one of the plurality of vend motors 65. Upon selection of a particular product container 49 or other commodity, one of the plurality of vend motors 65 is activated to rotate a respective cradle causing a product container 49, corresponding to the selected product, to emerge from vending machine 2. That is, product container 49 is transported to a product delivery chute 70 provided in delivery section 24 which is exposed to opening 20 in door 18. In order to maintain containers 49 in a refrigerated state, lower section 26 is provided with a cooling system 75. In general, the above description is provided for the sake of completeness and to enable a better understanding of the invention. The present invention is particularly directed to an adjustable rear wall assembly that allows the depth of stack areas 40–45 to be adjusted to accommodate various sized product containers 49.

Figure 2:
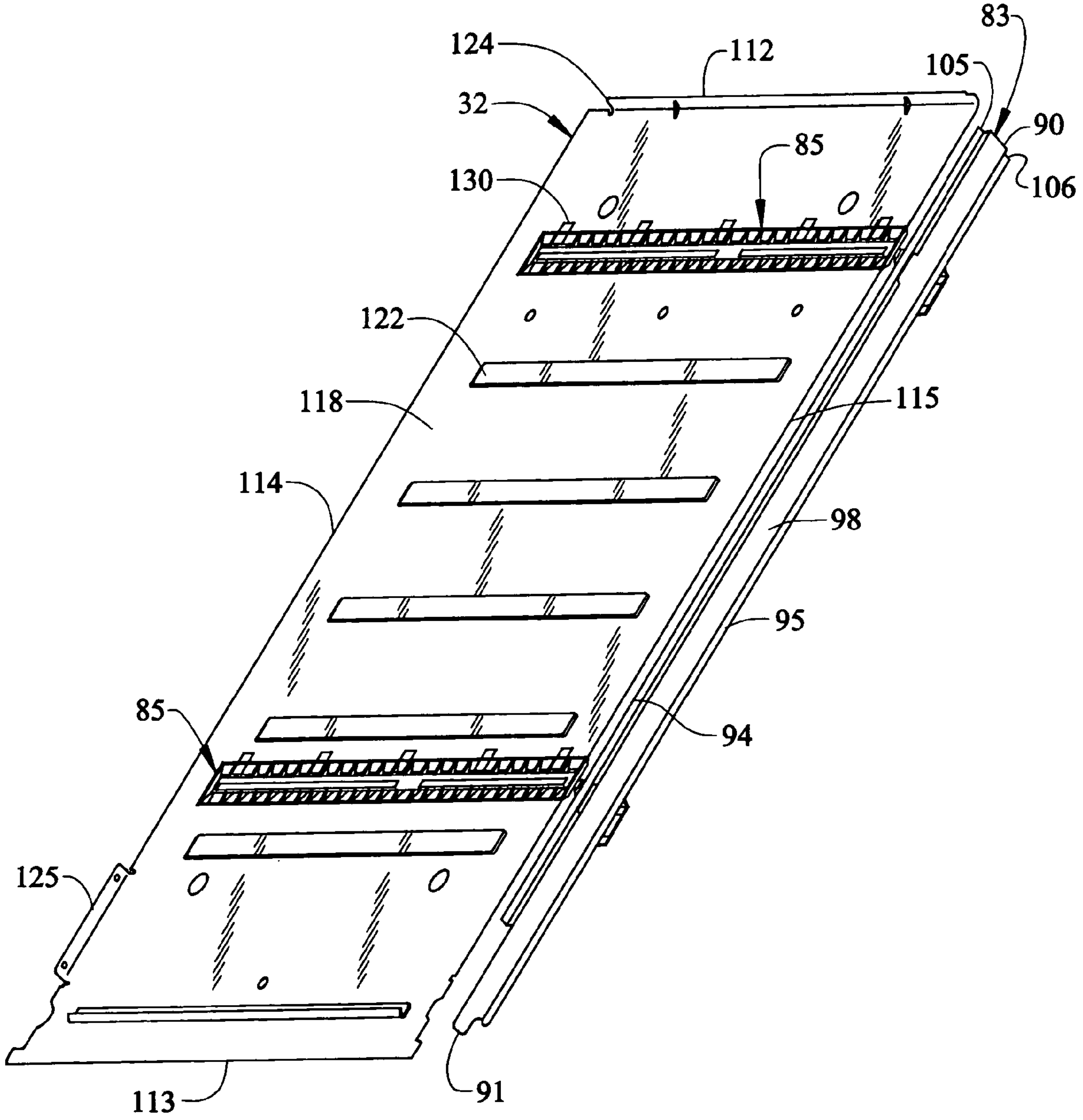
FIG. 2 is a perspective view of a column wall having upper and lower adjustable channel assemblies attached thereto.

FIG. 2 depicts a rear spacer wall 83 and a channel assembly 85 constructed in accordance with a preferred embodiment of the invention. For discussion purposes, rear spacer wall 83 and adjustable channel assembly 85 are shown with column wall 32. However, it should be understood that each of stack areas 40–45 and column walls 32–36 include a corresponding rear spacer wall 83 and, preferably, a pair of adjustable channel assemblies 85. Rear spacer wall 83 includes a top end 90, a bottom end 91, side edges 94 and 95, a front surface 98 and a back surface (not shown) and is preferably formed of a bendable material such as sheet metal. Rear spacer wall 83 is shaped such that side edges 94 and 95 form forwardly projecting L-shaped folds 105 and 106. L-shaped folds 105 and 106 form a backwardly extending ridge therebetween (not shown) in rear spacer wall 83 for engagement by adjustable channel assembly 85, as will be described in detail below.

Figure 3:
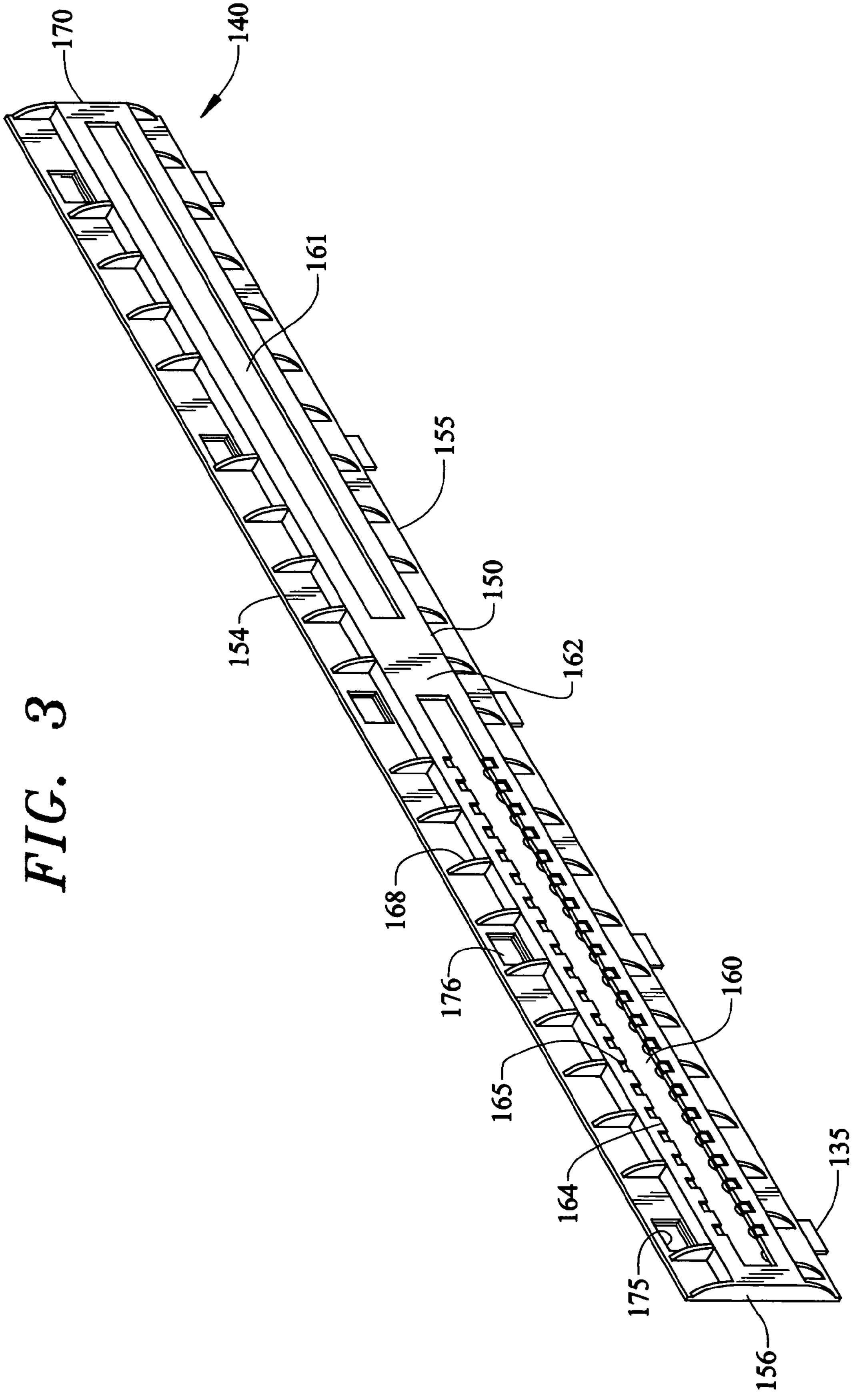
FIG. 3 is a perspective view of a guide channel incorporated in the adjustable channel assembly of FIG. 2.

As previously discussed, each of stack areas 40–45 is defined by two walls. For example, stack area 41 is defined by column walls 32 and 33. Each of column walls 32–36 includes a top edge 112, a bottom edge 113, a front edge 114 and a back edge 115. Further, each of column walls 32–36 includes a primary surface 118 to which a corresponding pair of channel assemblies 85 is attached, and a secondary surface (not shown) which faces an adjacent stack area. Each of column walls 32–36 is preferably formed of sheet metal. Various integrated stiffeners, one of which is indicated at 122, are formed in each column wall 32–36 for added strength. In order to assist in attaching each column wall 32–36 to cabinet frame 4, top edge 112 terminates in a top flange 124, and front edge 114 includes front flange 125. Further, each of column walls 32–36 includes a plurality of slots, one of which is indicated at 130, for receiving a plurality of tabs, one of which is indicated at 135 (see FIG. 3), in connection with mounting channel assembly 85 as will be discussed in detail below.

Figure 7:
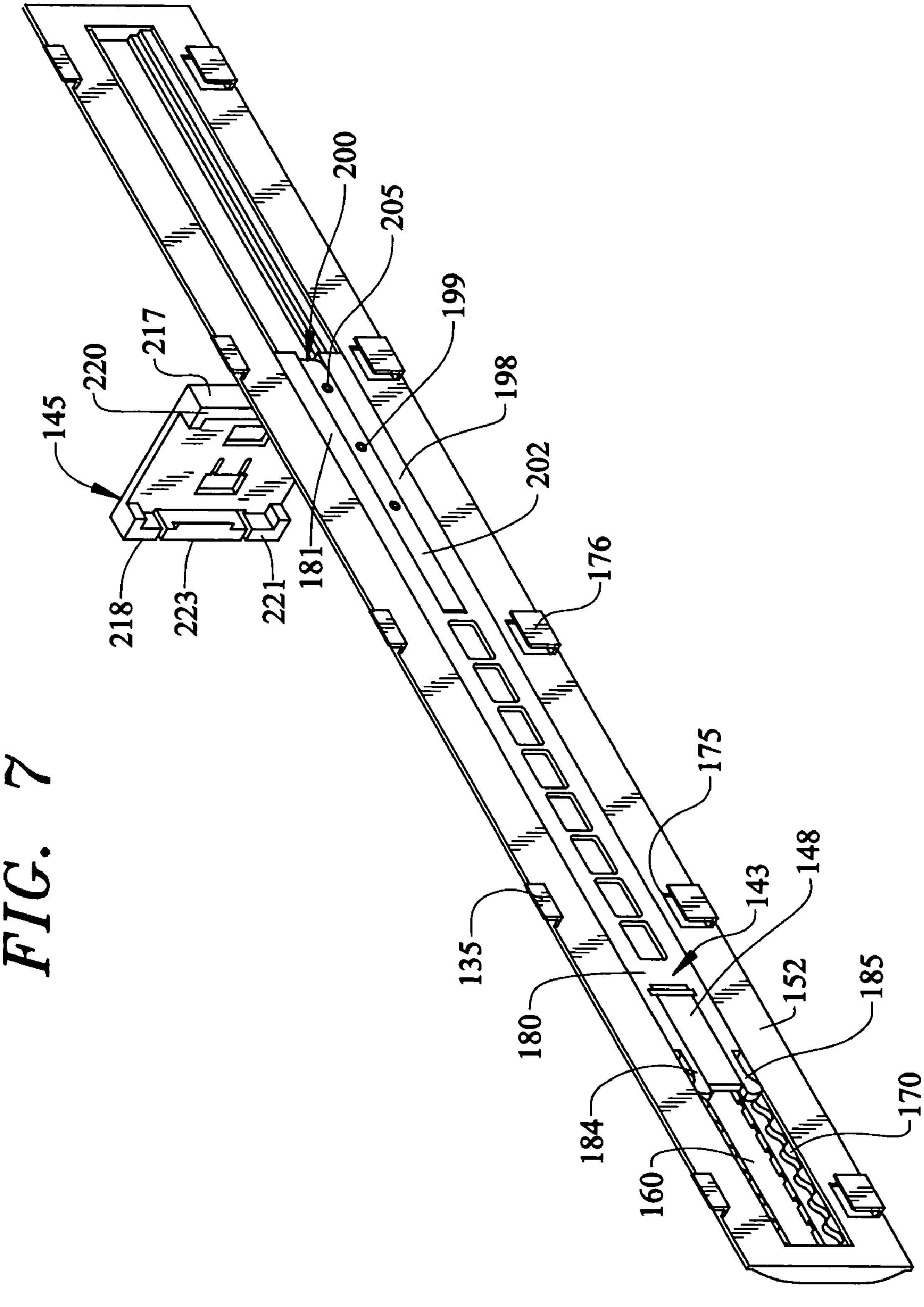
FIG. 7 is a view of the underside of the adjustable channel assembly.

With reference to FIGS. 3–7, each channel assembly 85 includes a guide channel 140, a guide arm 143, a rear spacer bracket 145, and a guide latch 148. Guide channel 140 includes a front side 150 and a back side 152. Additionally, guide channel 140 includes a top edge 154, a bottom edge 155, a front edge 156 and a back edge 170. First and second guide openings 160 and 161 are formed within guide channel 140. Guide openings 160 and 161 are separated by a bar 162 which adds dimensional stability to guide channel 140. Guide opening 160 is surrounded by a periphery 164 having notches 165 formed therein for selectively holding guide latch 148, which is pivotally attached to guide arm 143, in a locked position as will be discussed in detail below. A plurality of ribs, one of which is indicated at 168, extends from periphery 164 to top edge 154, and from periphery 164 downward to bottom edge 155 on front side 150 of guide channel 140. Back side 152 of guide channel 140, as shown in FIG. 7, includes undulations or ripples 170 formed around guide opening 160 for engaging a portion of guide arm 143 and holding guide arm 143 when in a locked position, preferably through a ratcheting mechanism as detailed below. Guide channel 140 also includes openings, one of which is indicated at 175, between selected ribs 168, with each opening 175 establishing a respective tab 176. In general, tabs 135 and 176 extend through respective spaced slots 130 to mount each guide channel 140 to a respective column wall 32–36.

Figure 4:
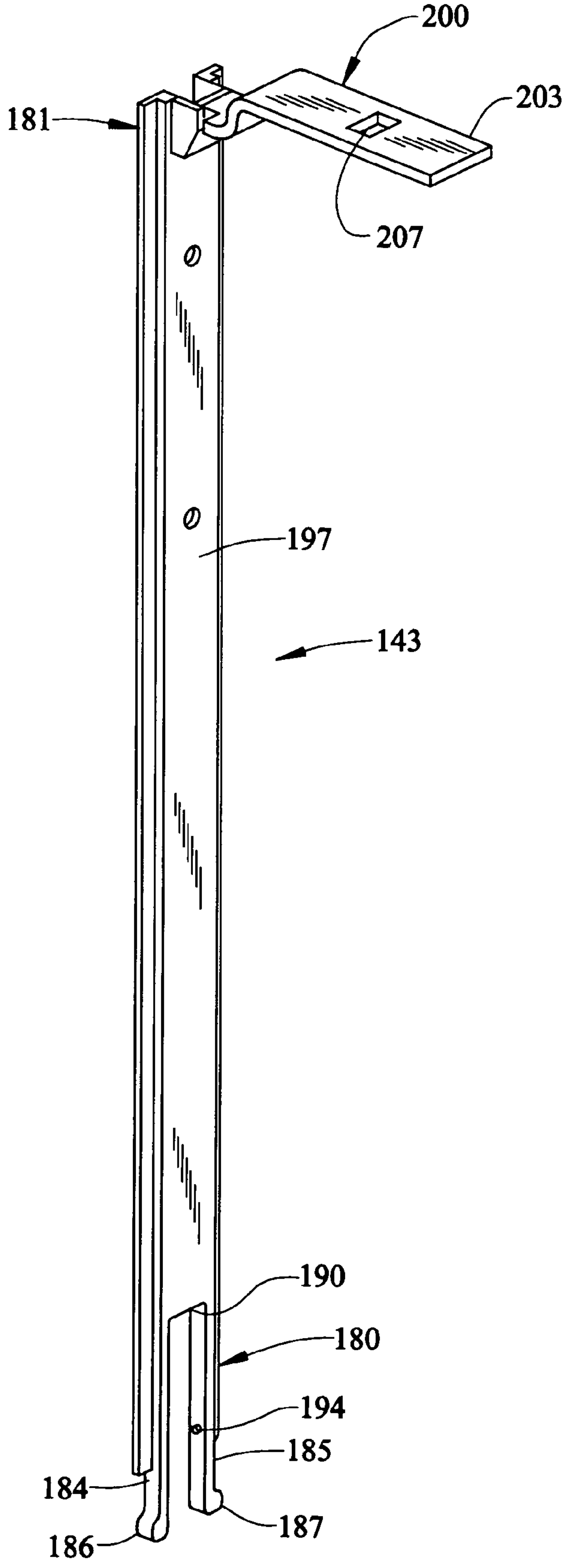
FIG. 4 is an isometric view of a guide arm incorporated in the adjustable channel assembly of FIG. 2.

As best shown in FIGS. 4 and 7, guide arm 143 constitutes a narrow piece that slidably fits within guide opening 160 from back side 152 of guide channel 140. Guide arm 143 includes a first end 180 and a second end 181. At first end 180, guide arm 143 includes extensions 184 and 185 which terminate in outwardly extending flanges 186 and 187 for engaging a selective set of ripples 170 provided on back side 152 of guide channel 140. For pivotally mounting and selectively retaining guide latch 148 relative to guide arm 143, extensions 184 and 185 also include indents, one of which is indicated at 190, for receiving protuberances, one of which is indicated at 192 in FIG. 6, located on guide latch 148 to mount guide latch 148 for pivotal movement relative to guide arm 143. Further, extensions 184 and 185 include protuberances, one of which is indicated at 194, for snapping into indents, one of which is indicated at 196 in FIG. 6, located on guide latch 148. Indents 196 and protuberances 192 on guide latch 148 engage indents 190 and protuberances 194 on extensions 184 and 185 of guide arm 143 to function as a detent mechanism for holding guide latch 148 in a locked position. Guide arm 143 includes a top surface 197 and a bottom surface 198. Bottom surface 198 has integrally molded protrusions 199 formed thereon. At second end 181, an L-shaped bracket 200, preferably formed of metal, is attached to guide arm 143. L-shaped bracket 200 includes a first leg 202 and a second leg 203. First leg 202 is positioned against bottom surface 198 of guide arm 143 such that holes 205 formed in first leg 202 engage protrusions 199 of guide arm 143 to hold L-shaped bracket 200 in place. Second leg 203 extends generally perpendicular to guide arm 143 and includes an opening 207 for attaching rear spacer bracket 145 thereto as will be described in detail below.

Figure 5:
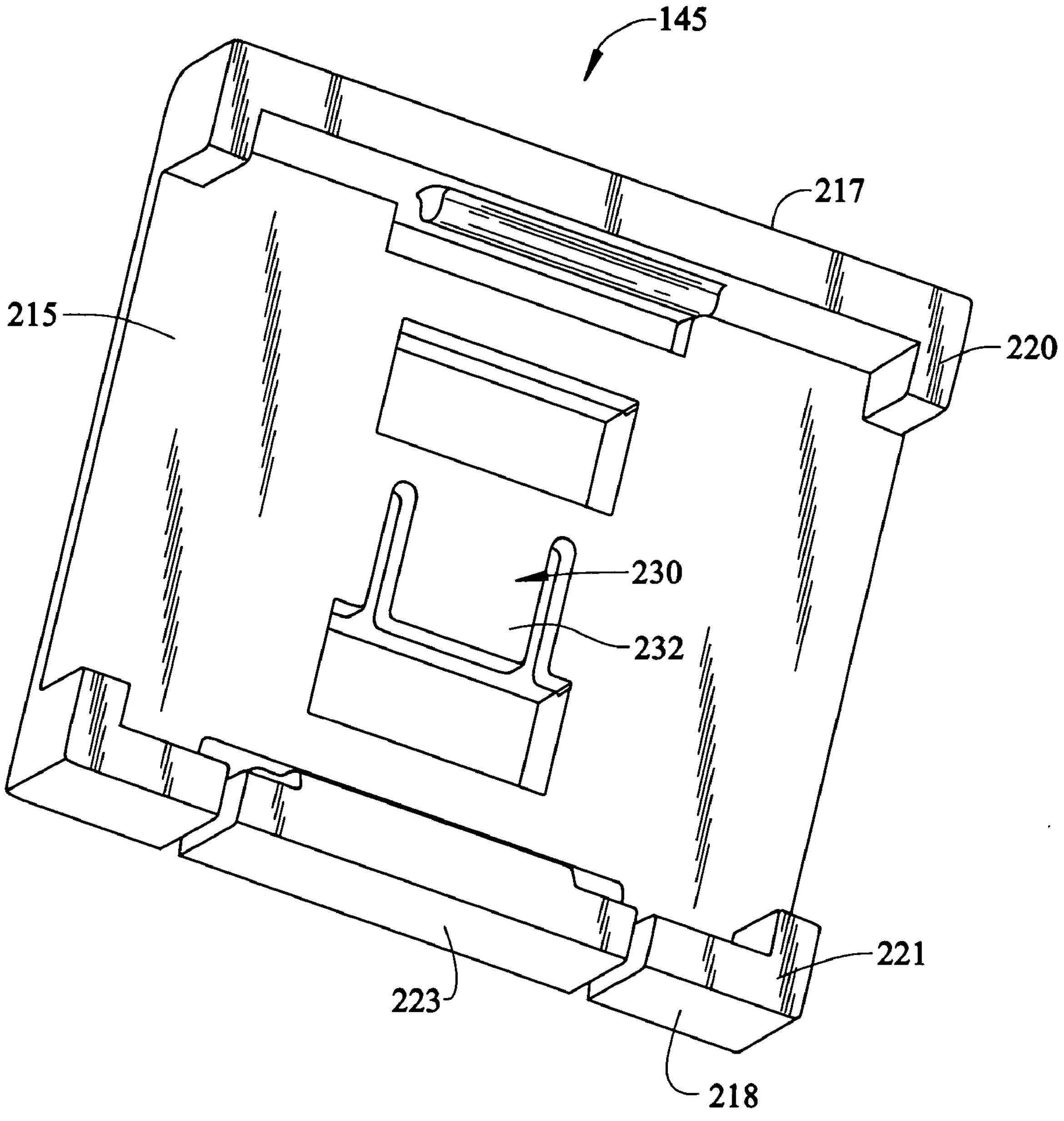
FIG. 5 is a front perspective view of a rear spacer bracket incorporated in the adjustable channel assembly of FIG. 2.
Figure 6:
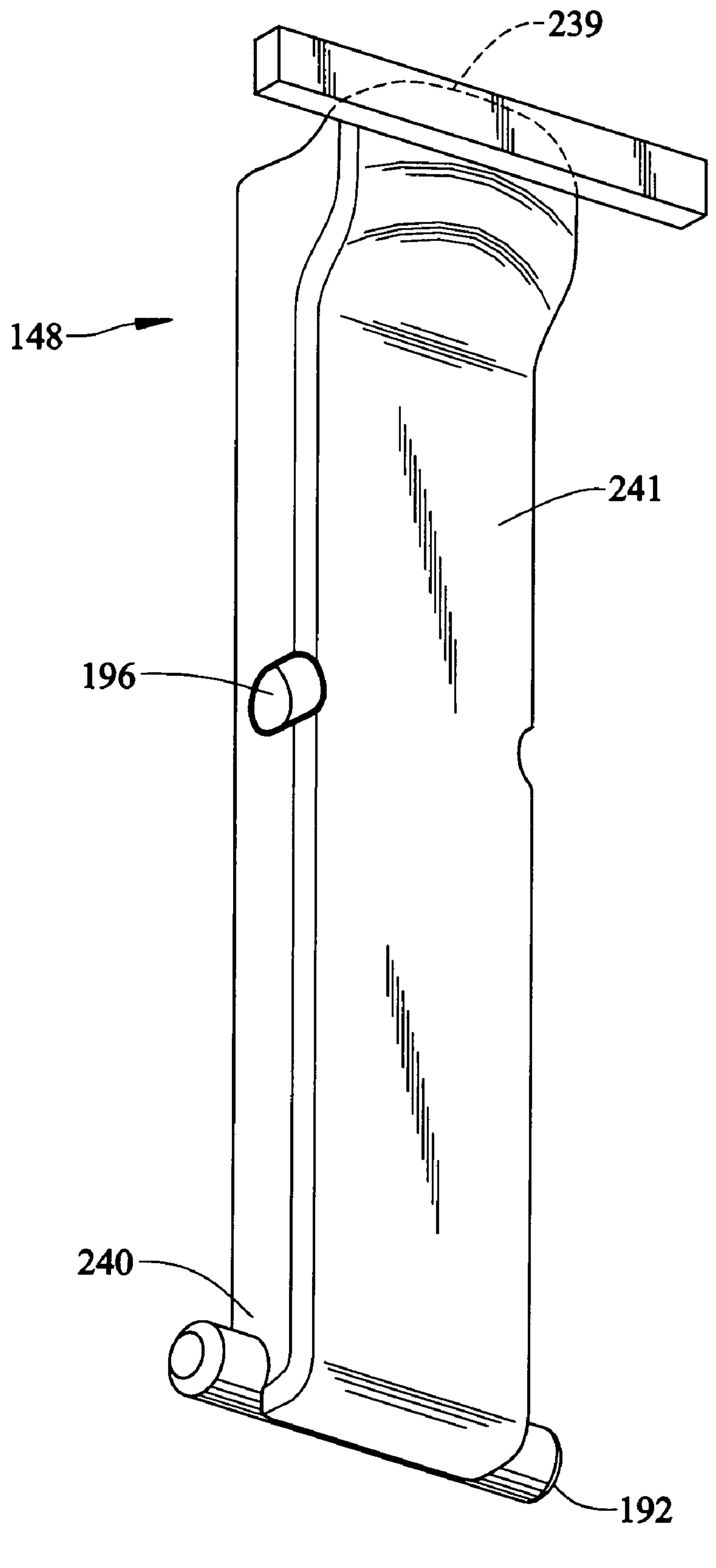
FIG. 6 is a perspective view of a guide latch incorporated in the adjustable channel assembly of FIG. 2.
Figure 12:
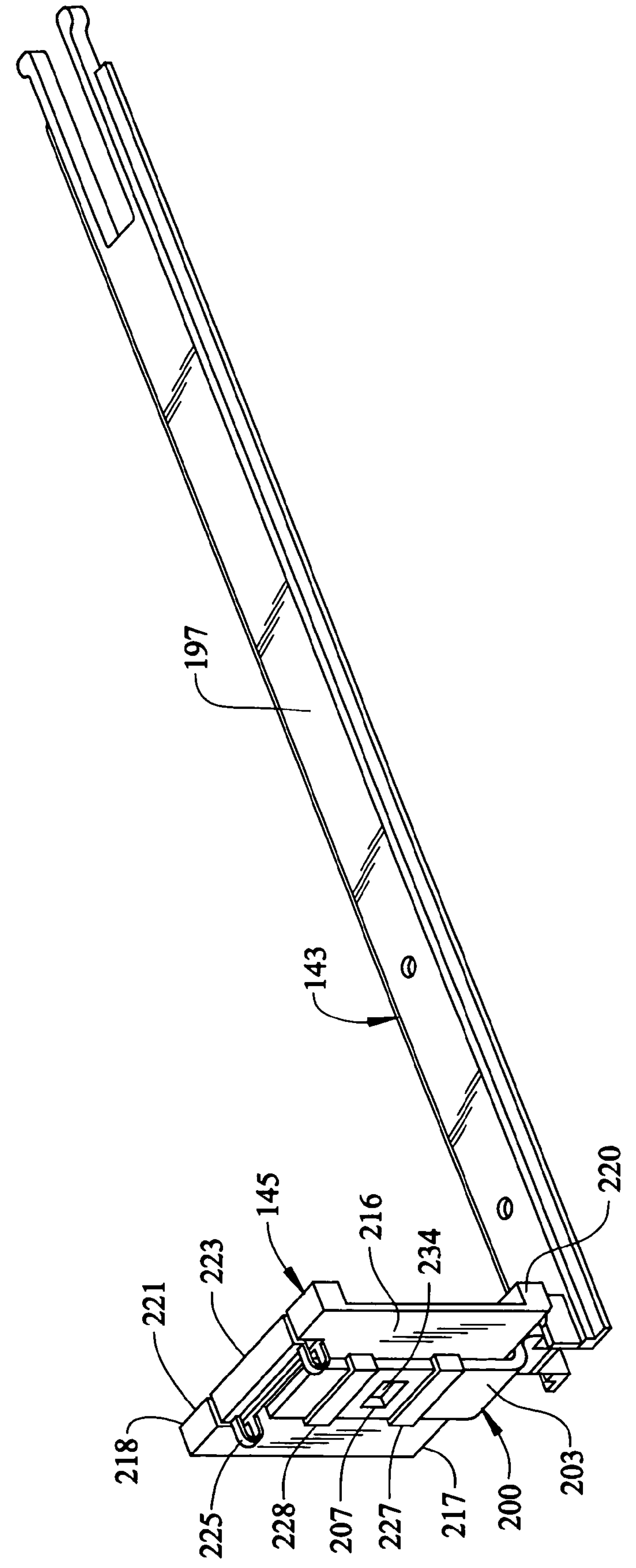
FIG. 12 is a rear perspective view of the rear spacer bracket and guide arm.

As shown in FIGS. 5, 7 and 12, rear spacer bracket 145 is attached to guide arm 143 by L-shaped bracket 200. Rear spacer bracket 145 includes a front side 215, a back side 216, a first end 217 and a second end 218. When attached to L-shaped bracket 200 as shown in FIG. 12, first end 217 is positioned adjacent to guide arm 143 and second end 218 is positioned opposite guide arm 143. First and second ends 217 and 218 form ledges 220 and 221, which extend outward from front side 215 of rear spacer bracket 145. Ledge 221 of second end 218 includes movable piece 223 that is secured to back side 216 of rear spacer bracket 145 by U-shaped connections 225. Back side 216 of rear spacer bracket 145 has integrally formed bands 227 and 228 extending outward such that second leg 203 of L-shaped bracket 200 may be inserted through bands 227 and 228. In addition, rear spacer bracket 145 includes a tab 230 having a front side 232 and a back side (not shown). The back side of tab 230 includes a projection 234 which projects into opening 207 of L-shaped bracket 200. Through the receipt of second leg 203 by bands 227 and 228 and the engagement of projection 234 of rear spacer bracket 145 in opening 207 of L-shaped bracket 200, rear spacer bracket 145 is securely snapped in place on L-shaped bracket 200. Movable piece 223 functions to clip rear spacer wall 83 to rear spacer bracket 145.

With reference to FIGS. 8–11, guide latch 148 is movable between a retracted or locked position and an open or unlocked position. When locked, guide latch 148 is snapped into position parallel with front side 150 of guide channel 140 (FIGS. 8 and 11), thereby preventing unintentional movement of rear spacer wall 83. When guide latch 148 is in an unlocked position (FIGS. 9 and 10), it serves as a convenient adjustment handle, as well as a position indicator. As actually best shown in FIG. 6, guide latch 148 includes first end 239, second end 240, first surface 241 and an opposing, second surface (not shown). First end 239 is sloped upward to assist a user in lifting guide latch 248 from the locked position to the unlocked position. First end 239 may also include lateral tabs (not shown) which snap into adjacent notches 165 along guide channel 140 to help secure adjustable channel assembly 85 in a desired locked position. As previously discussed, guide latch 148 includes indents 196 for receiving protuberances 194 of guide arm 143. Similarly, guide latch 148 includes protuberances 192 for engaging indents 190 of guide arm 143. Protuberances 192 of guide latch 148 remain within indents 190 of latch arm 143 throughout the operation of adjustable channel assembly 85 and allow guide latch 148 to pivot between the locked and unlocked positions.

Figure 8:
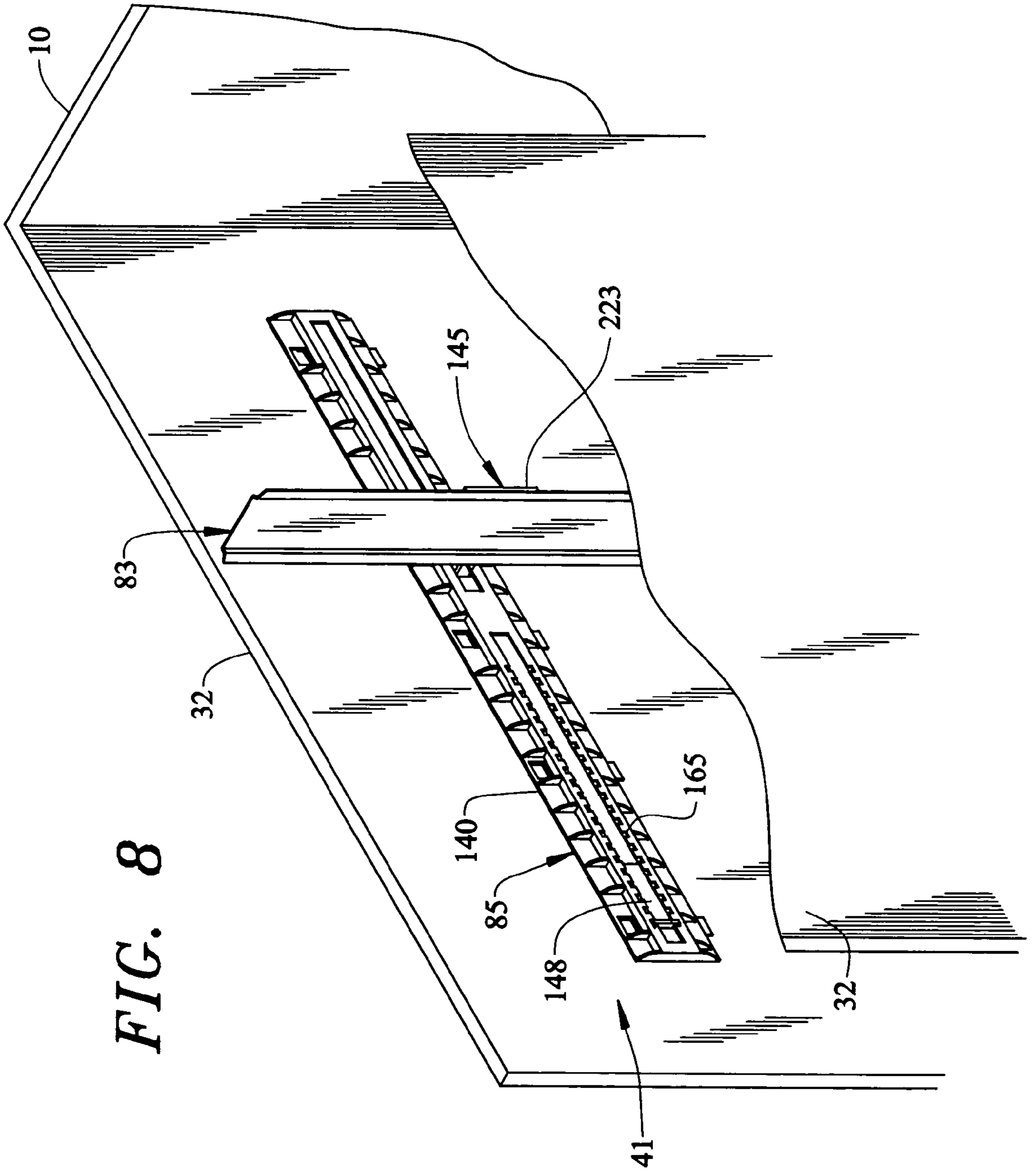
FIG. 8 is a view of the adjustable channel assembly in a retracted and locked position.
Figure 9:
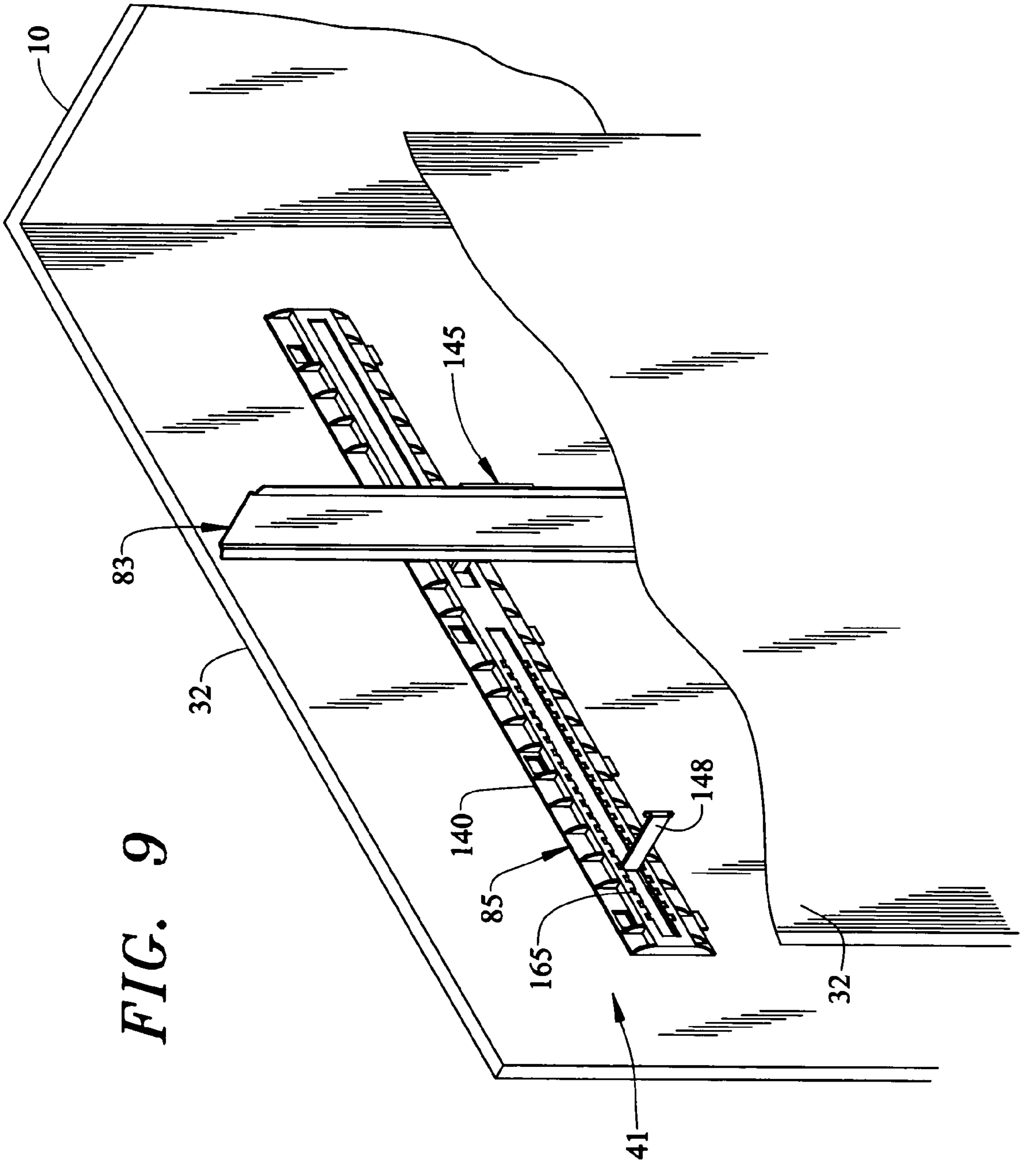
FIG. 9 is a view of the adjustable channel assembly in a retracted and unlocked position.
Figure 10:
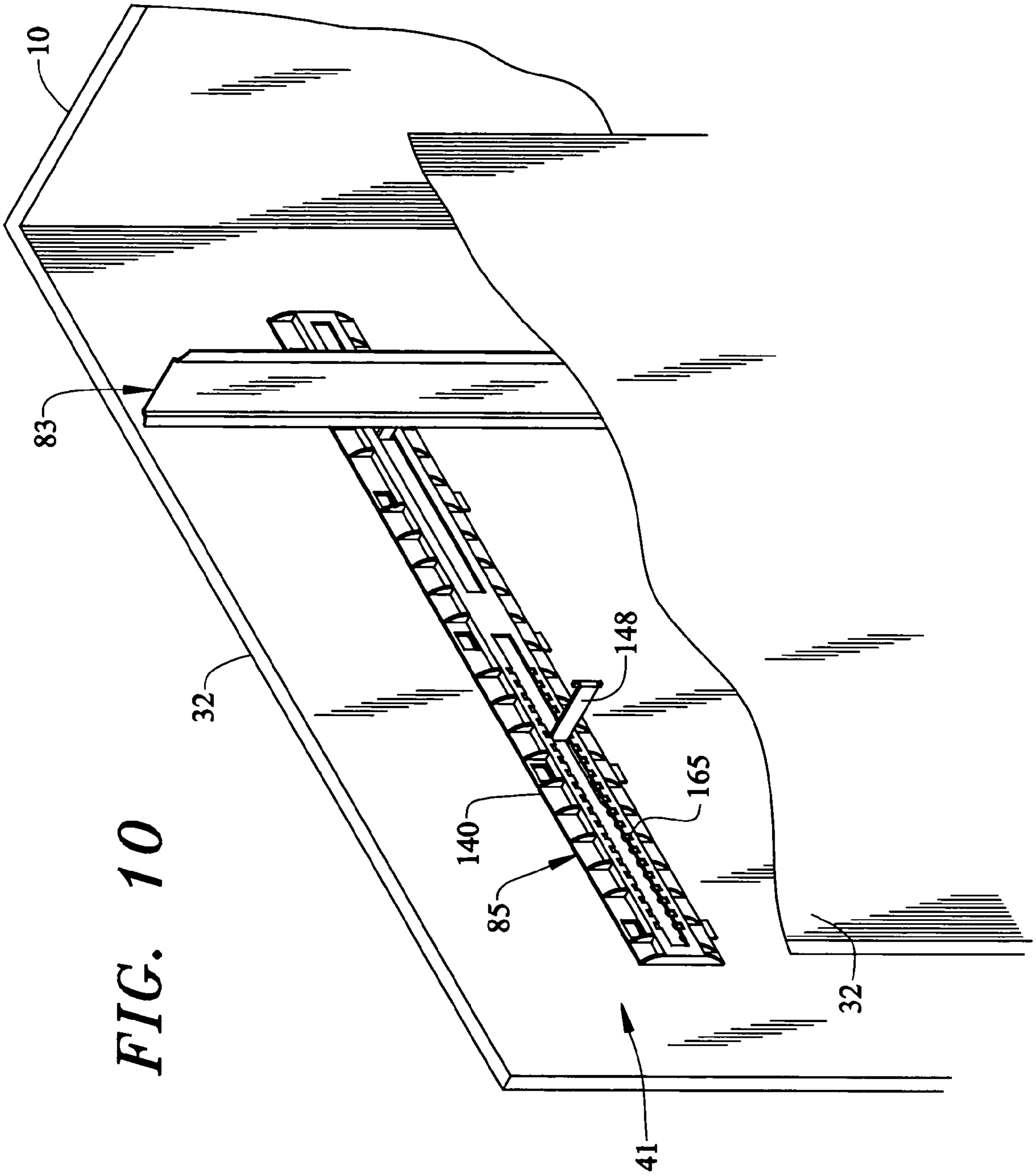
FIG. 10 is a view of the adjustable channel assembly in an extended and unlocked position.
Figure 11:
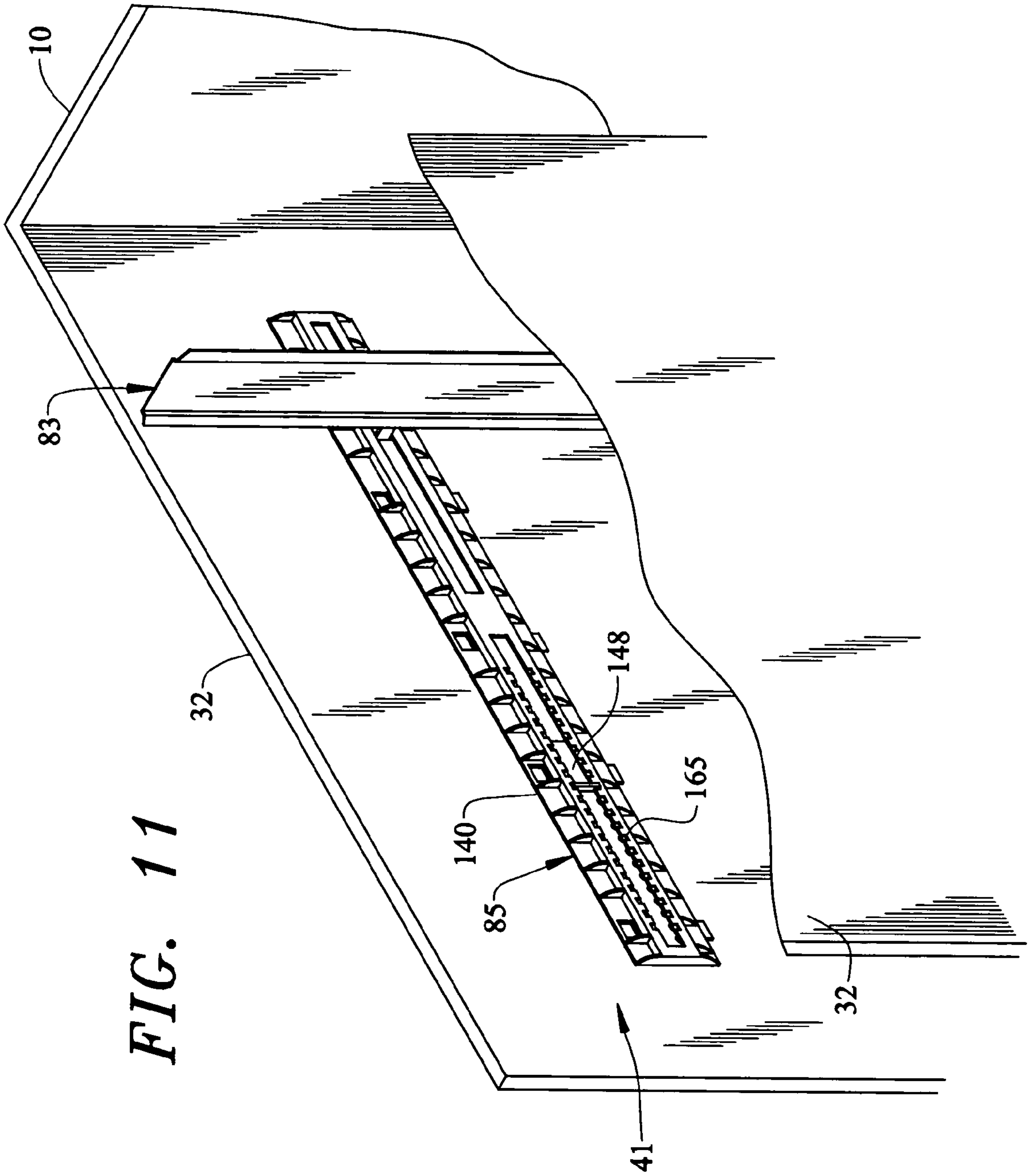
FIG. 11 is a view of the adjustable channel assembly in an extended and locked position.

FIGS. 8–11 illustrate adjustable channel assembly 85 and rear spacer wall 83 in various positions. FIG. 8 shows adjustable channel assembly 85 in a locked position, with rear spacer wall 83 in a forward position. The position shown in FIG. 8 is used to accommodate the dispensing of small bottles or cans. Obviously, when rear spacer wall 83 is located in this position, the fore-to-aft distance of stack area 41, which is available to receive product container 49, is reduced. In any case, note that guide latch 148 is shown in a locked position within guide channel 140. In order to adjust the depth of a particular stack area 40–45, a user must initially lift guide latch 148 to an unlocked position as shown in FIG. 9. The adjustable channel assembly 85 may then be used to move rear spacer wall 83 farther back within stack area 41 by pushing on guide latch 148. In FIG. 10, rear spacer wall 83 is shown to have been moved to a position closer to back wall 10, thereby allowing stack area 41 to accommodate larger bottles or cans. Once rear spacer wall 83 is positioned as desired, guide latch 148 needs to be pivoted from the unlocked position of FIG. 10 to a locked position as shown in FIG. 11.

Although described with reference to a preferred embodiment of the invention, it should be readily understood that various changes and/or modifications can be made to the invention without departing from the spirit thereof. Instead, the invention is only intended to be limited by the scope of the following claims.

We claim:

1. A vending machine comprising:

a cabinet frame including top, bottom, rear and side walls that collectively define a central cavity;

a plurality of column walls defining a plurality of stack areas for storing product containers;

a door pivotally mounted to the cabinet frame, said door being adapted to selectively close the central cavity;

an adjustable channel assembly attached to one of the plurality column walls, said adjustable channel assembly including a guide arm movable between forward and backward positions within one of the plurality of stack areas and a guide latch for selectively releasing the guide arm from within the central cavity; and a spacer wall extending across said one of the plurality of stack areas and being attached for movement with the guide arm, wherein forward movement of the guide arm decreases a depth of said one of the plurality of stack areas and backward movement of the guide arm increases the depth of said one of the plurality of stack areas.

2. The vending machine according to claim 1, wherein said adjustable channel assembly further includes a guide channel defining member attached to said one of the plurality of column walls, said guide arm being slidably supported by the guide channel defining member.

3. The vending machine according to claim 2, wherein the adjustable channel assembly further includes a rear spacer bracket mounted to the guide arm and extending across said one of the plurality of stack areas, said rear spacer wall being attached to the rear spacer bracket.

4. The vending machine according to claim 2, wherein the guide latch is pivotable between unlocked and locked positions.

5. The vending machine according to claim 4, wherein the guide latch is adapted to function, in the unlocked position, as a handle to facilitate sliding of the guide arm between the forward and backward positions and, in the locked position, the guide latch prevents movement of the guide arm.

6. The vending machine according to claim 5, wherein the guide channel defining member is provided with indents and said guide latch includes protuberances for engaging the indents, wherein the protuberances prevent the guide latch from inadvertently moving from the locked position.

7. The vending machine according to claim 2, wherein said one of the plurality of column walls is formed with various openings, said guide channel defining member including tabs extending within the various openings for mounting the guide channel defining member to said one of the plurality of column walls.

8. The vending machine according to claim 7, wherein the guide channel defining member is formed of plastic.

9. The vending machine according to claim 2, wherein the spacer wall is formed of sheet metal.

10. The vending machine according to claim 1, wherein two vertically spaced adjustable channel assemblies are provided on said one of the plurality of column walls, said spacer wall being attached to both of the vertically spaced adjustable channel assemblies.

11. The vending machine according to claim 2, wherein the guide arm is provided with a pair of extensions having flanges which engage the guide channel defining member.

12. The vending machine according to claim 2, further comprising: a rear spacer bracket attached to the guide arm, said spacer wall being fixed to the rear spacer bracket.

13. The vending machine according to claim 12, wherein the rear spacer bracket includes at least one band for interconnecting the rear spacer bracket to the guide arm.

14. The vending machine according to claim 13, wherein the rear spacer bracket further includes a movable piece for connecting the spacer wall to the guide arm.

15. A method of selectively altering a depth of a stack area defined, at least in part, by a column wall positioned in a central cavity of a vending machine comprising:

shifting a guide latch from a locked position to an unlocked position from within the central cavity to release a guide arm;

sliding the guide arm, which supports a rear wall of the stack area, relative to a guide channel defining member attached to the column wall; and repositioning the guide latch in the locked position to fix each of the guide arm and the column wall in a desired fore-to-aft position.

16. The method of claim 15, wherein the guide arm is slid relative to the guide channel defining member utilizing the guide latch as a handle.

17. The method of claim 15, wherein the guide latch is placed in the locking position by interengaging protuberances and indents of the guide latch and the guide channel defining member.

18. The method of claim 15, wherein the guide latch is pivoted between the unlocked and locked positions.

* * * * *